United States Patent [19]

Sundaram et al.

[11] Patent Number: 5,751,527
[45] Date of Patent: May 12, 1998

[54] MAGNETIC TAPE HEAD CONTOUR WITH LAND WIDTHS TO OPTIMIZE FLYING HEIGHT AND A SUFFICIENT NUMBER OF BLEED SLOTS TO UNIFORMLY MAINTAIN THE FLYING HEIGHT OF THE TAPE

[75] Inventors: Ramesh Sundaram; Terry J. Barber, both of Louisville, Colo.

[73] Assignee: Storage Technology Corporation, Loouisville, Colo.

[21] Appl. No.: 291,052

[22] Filed: Aug. 15, 1994

Related U.S. Application Data

[63] Continuation of Ser. No. 15,583, Feb. 10, 1993, abandoned.

[51] Int. Cl.⁶ .................................................. G11B 5/265
[52] U.S. Cl. ............................................. 360/122; 360/121
[58] Field of Search .................................. 360/122, 102, 360/103, 121, 125

[56] References Cited

U.S. PATENT DOCUMENTS 3,398,870  8/1968  Mullan et al. ...................... 360/103
4,375,656  3/1983  Radman, Jr. et al. .............. 360/122
4,479,158  10/1984  Froehlich et al. ................ 360/130.1
4,636,898  1/1987  Suzuki et al. ..................... 360/122
4,647,994  3/1987  Irwin et al. ........................ 360/85
5,220,473  6/1993  Brock et al. ...................... 360/121

OTHER PUBLICATIONS

*Historical Perspective of Tape Head Contours*, F. William Hahn, Jr., IBM Corporation, pp. 21–27, Tucson, Arizona 85744.

*Primary Examiner*—Stuart S. Levy
*Assistant Examiner*—William R. Korzuch
*Attorney, Agent, or Firm*—Sterne, Kessler, Goldstein & Fox P.L.L.C.

[57] ABSTRACT

An improved magnetic tape head contour for reading from and writing to magnetic tape moving across the tape head has a unique configuration of bleed slots such that land width is limited to a width that optimizes flying height at increased tape speeds on the order of 4 meters/second. The number of bleed slots is increased to minimize tape undulations thereby minimizing tape head wear profile undulations. A single gutter slot is optionally provided at each end of the tape head to reduce end element wear and increase the useful life of the heads.

19 Claims, 6 Drawing Sheets

MAGNETIC TAPE HEAD CONTOUR WITH LAND WIDTHS TO OPTIMIZE FLYING HEIGHT AND A SUFFICIENT NUMBER OF BLEED SLOTS TO UNIFORMLY MAINTAIN THE FLYING HEIGHT OF THE TAPE

This application is a continuation of application Ser. No. 08/015,583, filed Feb. 10, 1993, now abandoned.

CROSS-REFERENCE TO OTHER APPLICATION

The following application of common assignee, filed on the same day, contains some common disclosure with that of the present application:

TAPE HEAD CONTOUR WITH SINGLE OUTSIDE GUTTERS, Ser. No. 08/015,581, now abandoned.

BACKGROUND OF THE INVENTION

1. Field of the Invention

The present invention relates generally to magnetic tape heads, and more particularly to a magnetic tape head contour that provides optimized head-to-tape separations at high tape speeds.

2. Related Art

In order to obtain optimum performance in writing to and reading from magnetic tape, it is required that the moving tape be kept in close and stable proximity to the tape head. As the head-to-tape separation, or flying height, increases, performance deteriorates. The primary consequences of higher tape flying height are a decrease in read amplitude and an upward shift in the peak write current. Conversely, the read amplitude increases as the flying height decreases. Thus an increase in tape head performance can be obtained by minimizing flying height.

Early digital tape heads, designed to operate at low linear tape densities, were designed to come into contact with the magnetic tape. These early heads were replaced with "flying" contour heads which allowed low density recording at relatively large head-to-tape separations. As designers strived to achieve greater linear tape densities, they began to develop tape head contours that attempted to minimize the head-to-tape separation.

One such contour design is a cylindrical surface that incorporates bleed slots to minimize the flying height. The bleed slots are grooves in the contour surface and are typically formed parallel to the direction of motion of the magnetic tape. To understand the theory behind bleed slots it is helpful to consider the operation of a contour without bleed slots. As the tape moves across the slotless contour (a cylindrical surface), it drags air molecules along the head-to-tape interface, thereby creating a thin layer of air. It is this air layer that causes the tape to separate from the head. The addition of bleed slots helps to channel the air molecules away from the head-to-tape interface, thus reducing the height distribution of the layer of air. Thus, bleed slots function in a manner that is analogous to treads on a tire. Just as tire treads help to channel water away from the tire surface to help prevent hydroplaning, bleed slots help to channel air away from the head contour surface to minimize head-to-tape separation.

Conventional bleed-slotted tape head contours, however, do not meet challenges of today's magnetic tape marketplace. For example consider the IBM 3480 and the StorageTek 4480 tape head contours. These are contours having 18 bleed slots and two gutter slots at each end. The 3480/4480 heads comprise two read/write modules, wherein one module has bleed slots on both edges and the other module has bleed slots only on one edge. At a tape speed of 2 meters/second with thick tape (25.9 to 33.7 microns) the flying height is such that operation is nominal. However, when the tape speed is increased to 4 meters/second, the separation increases such that read/write efficiency decreases.

In this document, a read and/or write element is referred to simply as "element." Also, the term "end element" refers to the only "element" in a single-track tape head or to an element at either end of a multi-track tape head.

Another feature added to improve performance of tape head contours is gutter slots. Gutter slots are slots cut into each end of the tape head contour parallel to the direction of travel of the tape. Gutter slots are used to improve guiding the tape across the contour. The gutter slots are formed such that they span from one edge of the contour to the other edge. Examples of conventional gutter slot design are the IBM 3480 and StorageTek 4480 tape head contours which have two gutter slots at each end. Between the two gutter slots is a land and between the inside gutter slot and an adjacent element (i.e., the end element) is material of a given thickness.

A problem with this conventional gutter-slot design is premature wear that shortens the useful life of the tape head. The land between the gutters at the tape head gap wears quickly, thereby accelerating the wear of the tape head material between the inside gutter slot and the end element. As a result, the end element wears prematurely thus shortening the useful life of the head.

An additional problem with conventional tape head contour designs is that after prolonged usage, an undulating wear profile is obtained in a direction perpendicular to the motion of the magnetic tape. This is because the head-to-tape separation is not uniform across the tape but varies. In other words, the flying height of the tape (head-to-tape separation measured at a chosen point along the head-tape interface) varies from point to point across the tape. At points of lower flying height, wear of the head is more pronounced than at points of greater flying height.

What is needed, therefore, is a tape head contour that, at increased speeds (at least 4 meters/second), provides head-to-tape separations across the head-to-tape interface that are comparable to those separations provided by conventional bleed slotted contours at a tape speed of 2 meters/second.

SUMMARY OF THE INVENTION

The present invention is a magnetic tape head contour that provides a unique configuration of bleed slots and gutter slots that both optimizes the head-to-tape separation at high tape speeds, and offers improved wear characteristics. The problem of increased head-to-tape separation at high tape speeds is solved by limiting the thickness of the lands between the bleed slots. Limiting the land thickness helps to optimize the air-film thickness at the head-to-tape interface. For tape speeds on the order of 4 meters/second an optimum land thickness of 0.0055 inches is selected. This land thickness provides an optimum head-to-tape separation and does not introduce insurmountable manufacturing difficulties.

The problem of the undulating wear profile is solved by providing an optimum number of bleed slots. The inventors have discovered that the number of bleed slots provided has a direct effect on the degree of undulation across a magnetic tape. Proper selection of this number minimizes tape undulations and hence results in a more uniform wear profile.

For ease of manufacturing, the bleed-slot pattern is allowed to "float" such that the lands between the end bleed slots and the gutters (referred to as "end lands") may be wider or narrower than the preferred 0.0055 inches. This variation in thickness of the two end lands does not adversely impact head-to-tape separation or alter the wear profile in a manner that significantly impacts performance.

The problem of end element wear is solved by replacing the dual-gutters with a single gutter slot at each contour end. By using a single gutter, the amount of tape head material between each gutter and its adjacent end element is increased. Thus, the tape must wear through more material before it begins to affect end element read/write performance. Therefore, the onset of wear on the end elements is delayed, leading to increased head life.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

1. Overview and Discussion of the Invention

The present invention is a magnetic tape head contour having a unique configuration of bleed slots such that head-to-tape separation is reduced, especially at greater tape speeds, and such that flying height over the entire length of the read/write gap is uniform. Furthermore, the present invention provides a single gutter slot at each end of the head.

The present invention reduces the thickness of the material between the bleed slots to reduce the head-to-tape separation. This material between two adjacent bleed slots is referred to as a "land." The inventors have discovered that at any given tape speed, the head-to-tape separation is affected by the thickness of the lands, and not the actual number of bleed slots.

Figure 1A:
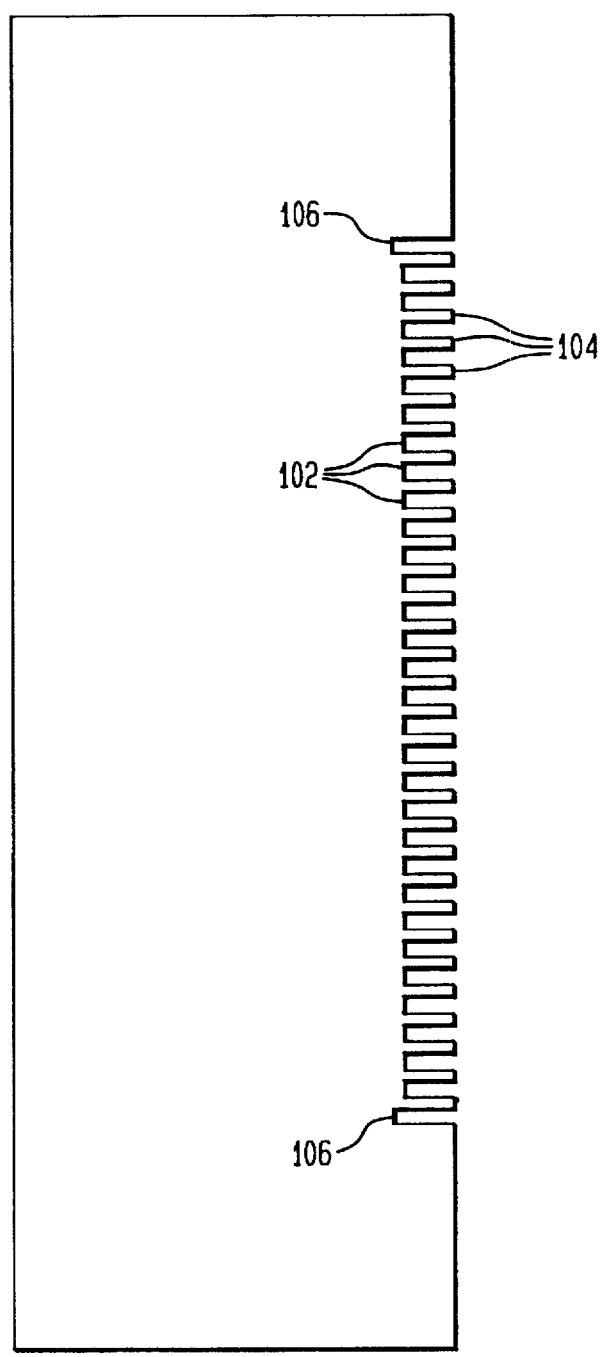
FIG. 1A is a side view of a tape head contour illustrating bleed slots cut into the contour, resultant lands between the bleed slots and a gutter slot at each end of the contour.

FIG. 1A is a side view of a magnetic tape head illustrating tape head contour bleed slots, lands and gutter slots. Referring to FIG. 1A, bleed slots 102 are provided to channel air molecules away from the surface of the head. The inventors have discovered that the thickness of lands 104 between bleed slots 102 is a key factor in determining head-to-tape separation. Thus, according to the present invention, the thickness of lands 104 is minimized to decrease head-to-tape separation.

According to a preferred embodiment, the width of each land 104 is 0.0055 inches, and is controlled to within ±0.0005 inches. This thickness provides a nominal flying height for thick tape (25.9 to 33.7 microns) and for thinner tapes (16.13 to 18.03 microns) at a 4 meters/second tape speed that is comparable to the flying height provided by the IBM 3480 and StorageTek 4480 conventional heads at a 2 meters/second tape speed. By contrast, the land thickness for these conventional heads is on the order of 0.0092 inches.

As the thickness of lands 104 is increased, head-to-tape separation increases, and as thickness decreases, head-to-tape separation decreases as well. As described above, system performance is enhanced as head-to-tape separation decreases. However, tape head contours with thinner lands 104 are more difficult and costly to manufacture. Thus, a tradeoff exists between ease of manufacturing and performance. The preferred thickness of 0.0055 inches provides an optimum balance between these two factors.

Land widths greater than 0.0055 inches are possible. At increased tape speeds (on the order of 4 meters/second), read/write operations of the tape head contour perform adequately up to approximately 0.0065 inch land widths 104. But, land widths above 0.0065 inches lead to greater flying heights at the 4 meter/second speed and degraded performance. Additionally, land widths thinner than 0.0055 inches can be utilized to further decrease flying height. However, widths thinner than approximately 0.0040 inches are impractical due to limitations of conventional manufacturing processes and the increased likelihood of breakage of such a thin land 104. Thus, a practical range of land thicknesses is from approximately 0.0040 inches to approximately 0.0065 inches.

As mentioned above, land thickness is a key to reducing head-to-tape separation. Therefore, the actual number of lands 104 (and thus slots 102) provided is not the critical parameter to this end. The actual number of lands 104 can be altered as long as the thickness is controlled as described above.

Although the actual number of bleed slots 102 is not critical to head-to-tape separation, a preferred embodiment has thirty (30) bleed slots 102. This number was chosen to simplify manufacturing. With the number at thirty (30) the bleed slots 102 can be cut with a gang of 3, 5, 6, 10, or 15 blades. Alternative embodiments may be considered wherein the actual number of bleed slots 102 is some number other than thirty (30). For example the number of bleed slots 102 can be 20 or 24. Regardless of the number of bleed slots chosen, the width of each land 104 should be maintained as described above to minimize head-to-tape separation.

The number of bleed slots is, however, an important parameter in minimizing tape undulations and an undulating wear profile. As the number of bleed slots (and hence the number of lands) is increased, the degree of tape undulation decreases. To understand this, consider an analogy to a circus tent where the lands can be thought of as tent poles, bleed slots as separation between the poles, and the tape as the tent itself. When only a few tent poles are used, there is a large separation between them. In this case, the roof of the tent sags significantly in the areas between the poles. As the number of tent poles is increased, there is less separation between poles, resulting in decreased roof sag between the poles. Thus, with more tent poles, the undulations in the tent roof are less pronounced. So too with the tape head contour.

As the number of lands is increased, tape "sag" between lands is decreased, resulting in a more uniform head-to-tape separation across the tape.

The thirty bleed-slot configuration described in the preferred embodiment above, provides a reduction in the undulating wear profile over conventional slotted configurations. Of course, the actual number of slots (and lands) can vary depending on the application, but, in general, as more slots are added, the undulating wear profile is minimized.

According to a preferred embodiment, the tape head contour is provided with a single gutter slot at each end as opposed to dual gutter configurations of conventional designs. Using a single gutter at each end increases the amount of tape head material between each gutter and its adjacent end element. Thus, the tape must wear through more material before it begins to affect end element read/write performance. Therefore, the onset of wear on the end elements is delayed, leading to increased head life.

Figure 5:
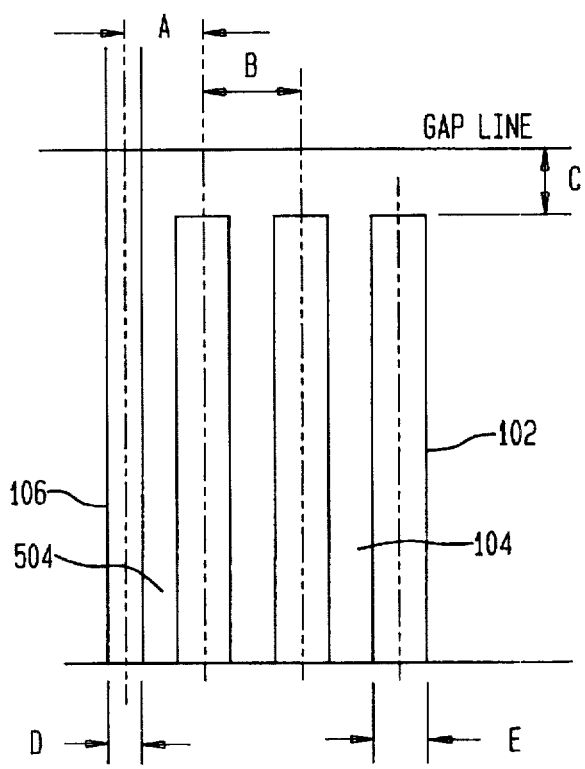
FIG. 5 is a diagram illustrating the widths of the bleed slots and gutter slot for a thirty-bleed-slot tape head contour.

FIG. 5 is an overhead view illustrating a portion of one end of a tape head contour having thirty bleed slots. FIG. 5 illustrates the width of gutter slot 106 and bleed slots 102, and their relative placement. As discussed above, thirty bleed slots are provided such that the widths of lands 104 is 0.0055 inches. A single gutter slot 106 is situated on each end of the head. Gutter slot 106 is 0.0089 inches wide (shown as dimension D in FIG. 5) in a preferred embodiment and is situated such that its center is 0.0153 inches from the center of adjacent bleed slot 102 (shown as dimension A in FIG. 5). This results in a nominal end-land 504 thickness between gutter slot 106 and adjacent bleed slot 102 of 0.0055 inches. In this embodiment, bleed slots 102 are 0.0107 inches wide (shown as dimension E in FIG. 5), and the separation between the center lines of bleed slots 102 is 0.0162 inches (shown as dimension B in FIG. 5). The distance between the edge of each bleed slot 102 and the gap line is 0.0210 (shown as dimension C in FIG. 5).

For ease of manufacturing, the bleed-slot pattern is allowed to "float" such that end lands 504 may be wider or narrower than the preferred 0.0055 inches. This variation in thickness of the two end lands 504 does not adversely impact head-to-tape separation or alter the wear profile in a manner that significantly impacts performance.

The use of a single gutter slot on each end is not limited to the thirty-bleed-slot embodiment. Numerous alternative embodiments can benefit from the improved wear characteristics of the single-gutter-slot contour design. Even the conventional IBM 3480 and StorageTek 4480 tape heads would benefit from the improved wear characteristics provided by using a single gutter slot on each end.

Figure 1B:
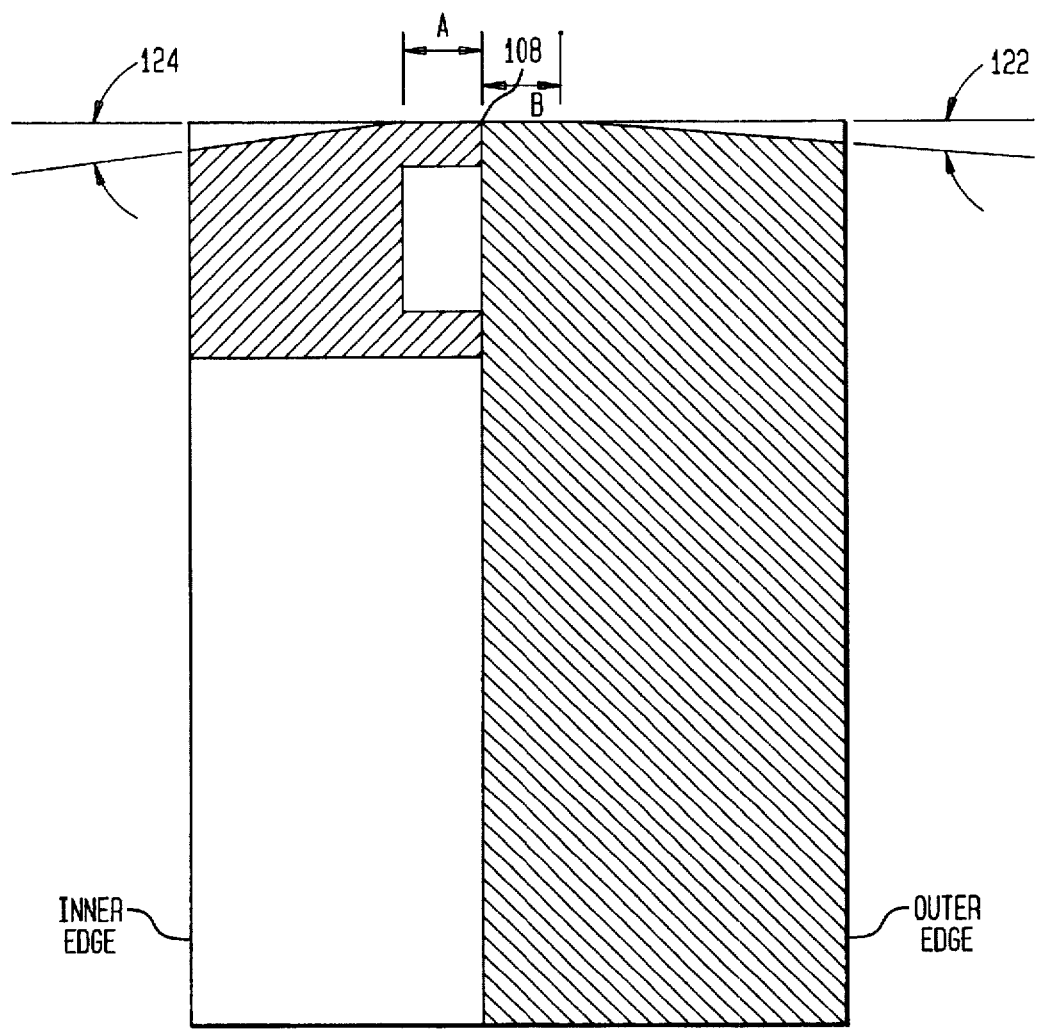
FIG. 1B is cross-sectional view of a tape head contour illustrating preferred angles for the bleed slots.

FIG. 1B is a cross-sectional view of a tape head contour illustrating the angle at which bleed slots 102 are cut into the tape head contour in a preferred embodiment. The outer bleed slot angle 122 is chosen at 13.80±0.25 degrees, while the inner bleed slot angle 124 is 9.70±0.25 degrees.

The cylindrical radius of the contour is 0.79 inches. The apex location is 0.014 inches from the inner edge. A read/write gap 108 is centered between the bleed slots at 0.021 inches from each slot. This is shown in FIG. 1B as dimension A and dimension B, each of which are 0.021 inches.

2. Example Implementation

Figure 2:
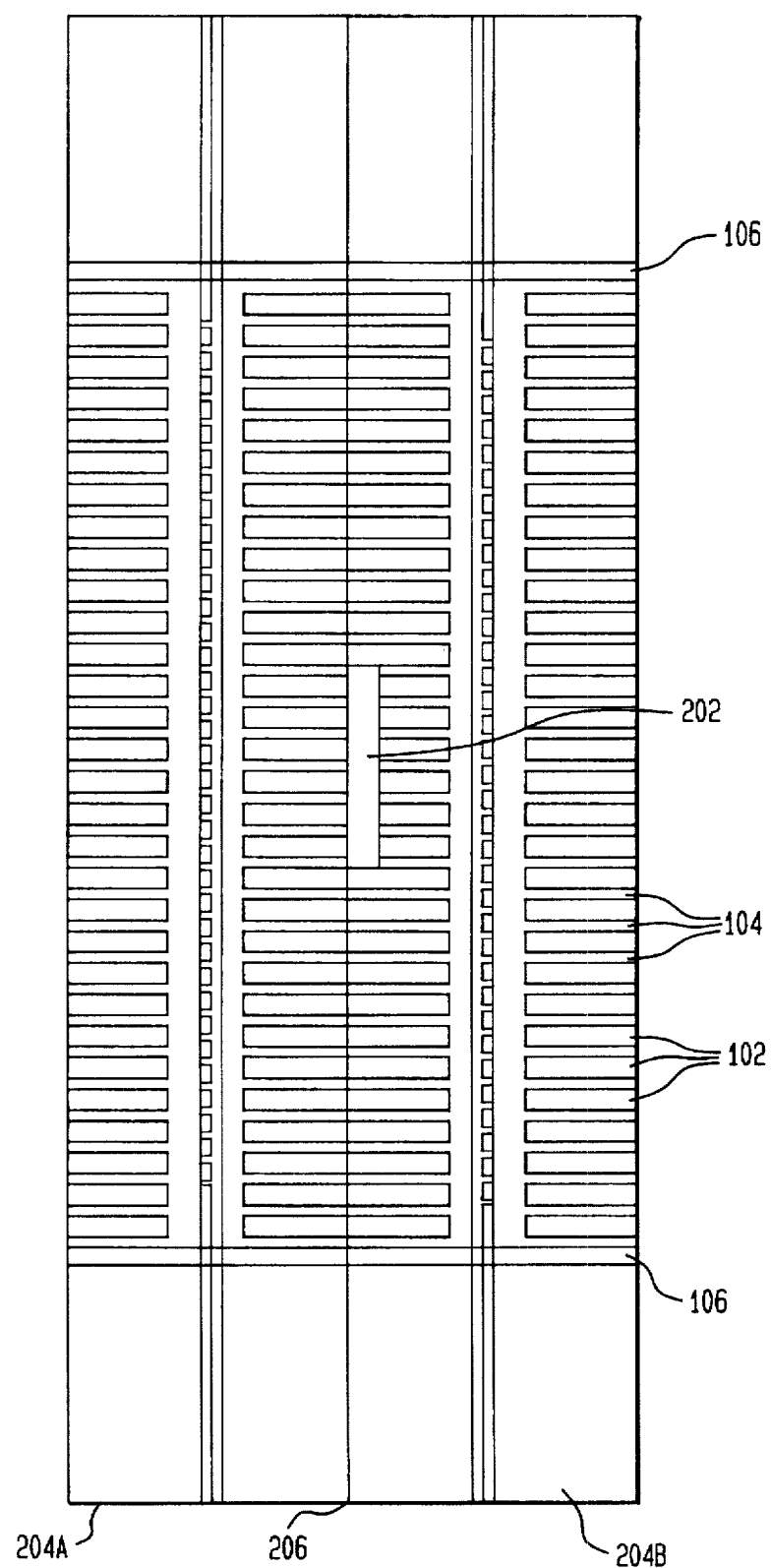
FIG. 2 is a top view of a tape head contour illustrating bleed slots, lands and gutter slots.
Figure 3:
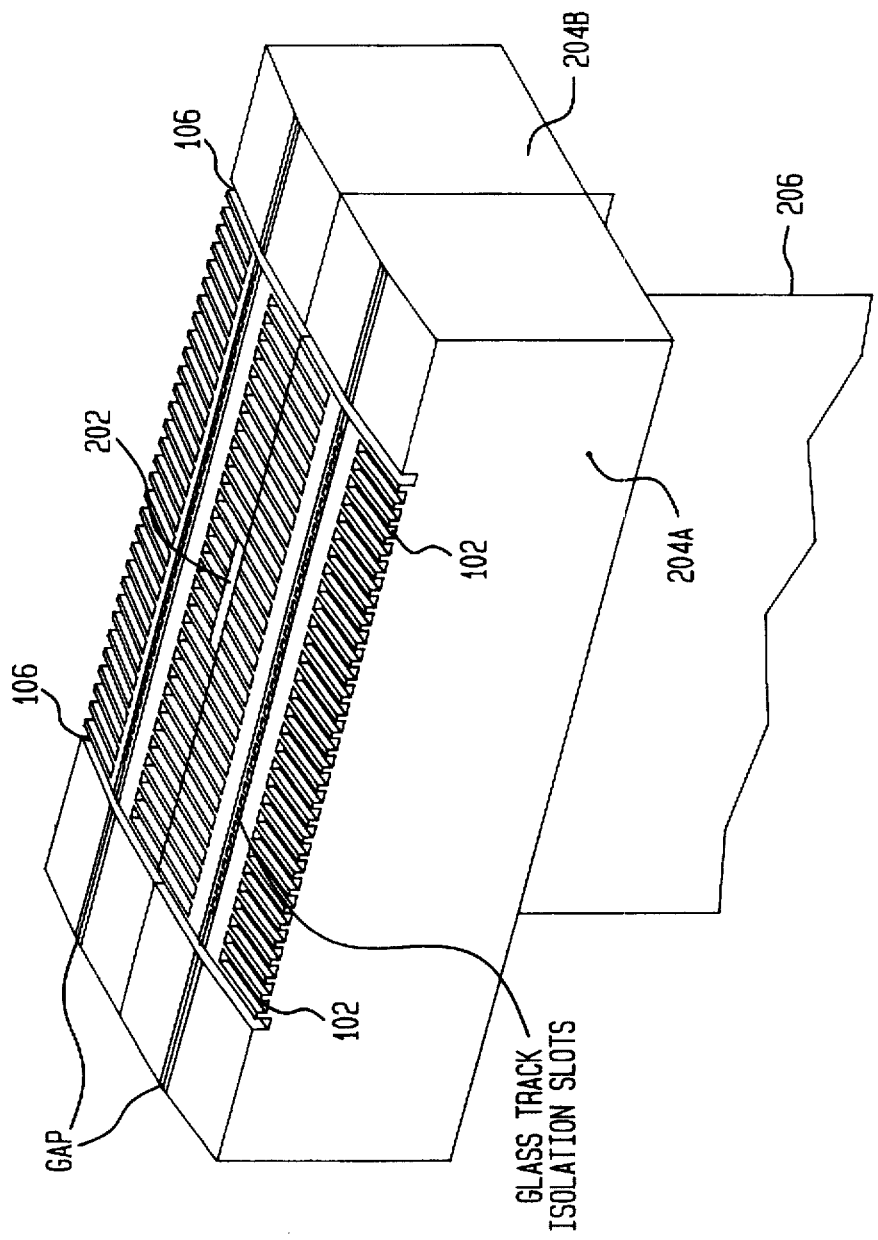
FIG. 3 is a side-angle view of a tape head contour illustrating bleed slots, lands and gutter slots.

An example implementation of the invention is illustrated in FIGS. 2 and 3. FIG. 2 is an overhead view, while FIG. 3 is a perspective view.

Referring now to FIGS. 2 and 3, the head in this example comprises two read/write modules 204A, 204B separated by a brass center shield 206. The example implementation has thirty (30) bleed slots 102 on each edge of each read/write module 204A, 204B. In alternative embodiments, modules 204A, 204B could be read-only, write-only, or read and/or write modules.

Note, the tape head contours described herein could also be implemented such that bleed slots 102 are omitted from one edge of one or both read/write modules 204A, 204B. With such an implementation, head-to-tape separation is only minimized for tape directions such that the entry edge has bleed slots 102.

Figure 4:
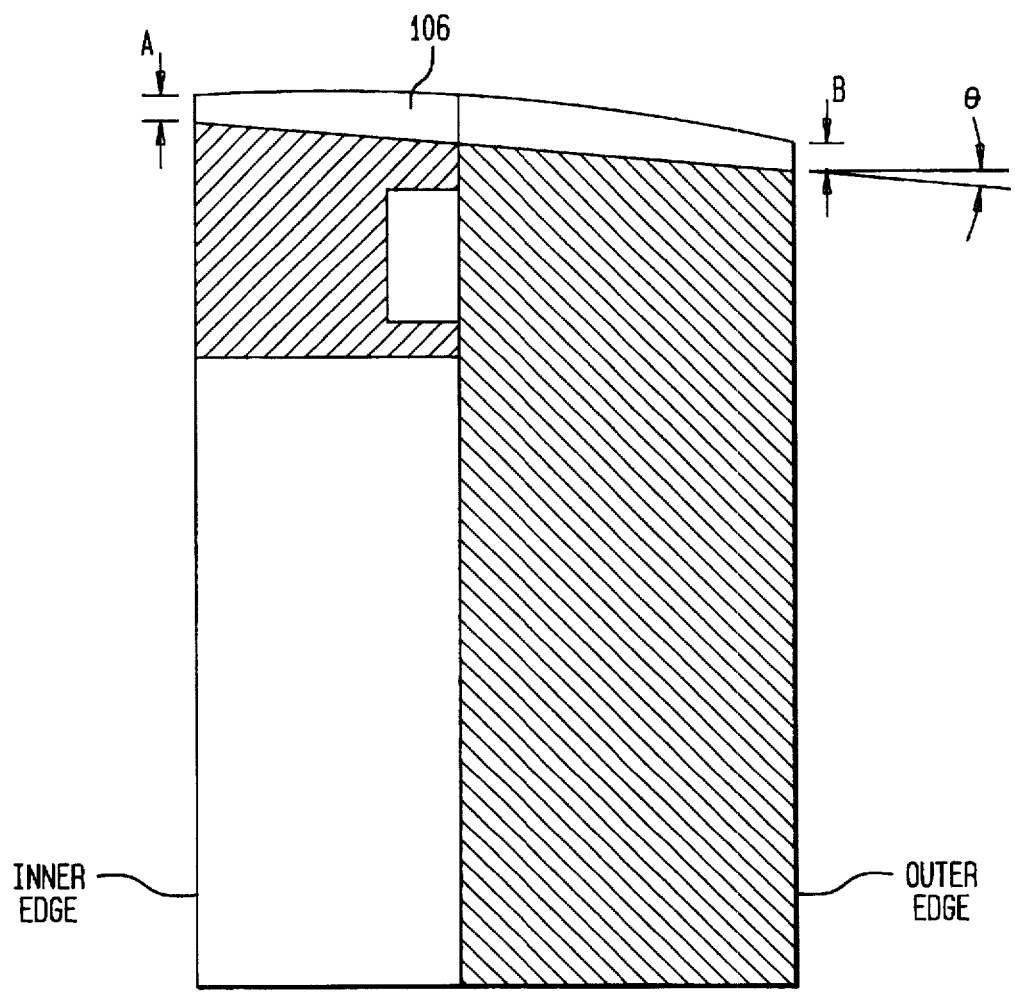
FIG. 4 is cross-sectional view of a tape head contour illustrating a preferred angle and depth for a gutter slot.

Two gutter slots 106 are provided, one on each end of head modules 204A, 204B. In a preferred embodiment, each gutter slot 106 is 0.0089±0.0005 inches in width. Gutter slots 106, used to improve tracking and prevent grooving of the tape head contour, are well known in the art. FIG. 4 is a cross-sectional view of one read/write module 204A, 204B and illustrates the depth of gutter slots 106. According to a preferred embodiment, gutter slots 106 are 0.0070±0.003 inches in depth at the inside edge (shown as dimension A in FIG. 4) and 0.0070±0.0015 inches in depth at the outside edge (shown as dimension B in FIG. 4). Because the overall tape head contour is sloped from the outer edge to the inner edge, each gutter slot 106 is cut at an angle θ of 4.41 degrees as illustrated by FIG. 4.

An air duct 202 is used to maintain tape-head separation while read/write operations are not taking place. The use of air duct 202 is well known in the art.

One problem with manufacturing a tape head having lands on the order of 0.0055 inches is that of meeting tolerance specifications. In meeting tolerance specifications it is critical that all lands 104 situated between the bleed slots are within tolerance. For example, for the preferred embodiment having thirty (30) bleed slots 102 with 0.0055 inch wide lands 104, it is important that a tolerance of ±0.0005 inches is maintained.

One advantage of the floating bleed-slot-pattern placement as described above, is that end lands 504 do not have to meet as stringent a tolerance requirement as lands 104. In other words, the bleed-slot-pattern placement tolerance is relaxed. In a preferred embodiment, the placement of bleed slots 104 is specified such that thickness of end lands 504 is approximately 0.0054±0.0009 inches.

Figure 6:
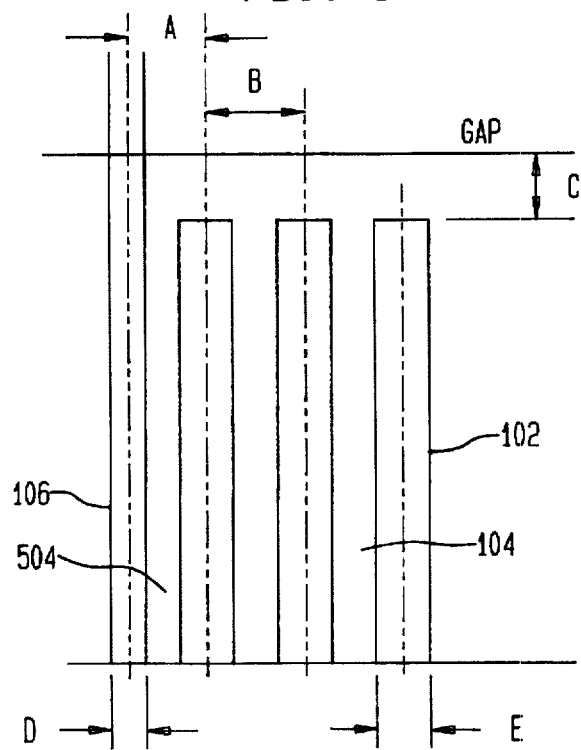
FIG. 6 is a diagram illustrating the widths of the bleed slots and the gutter slot for a twenty-bleed-slot tape head contour.

FIG. 6 is an overhead view illustrating the single gutter slot 106 configuration for a tape head having twenty bleed slots 102. In this embodiment, bleed slots are 0.0156 inches wide (shown as dimension E in FIG. 6) and the nominal land 104 size is 0.0085 inches. In this embodiment, the center lines of bleed slots 102 are separated by 0.0241 inches (shown as dimension B in FIG. 6). Gutter slot 106 width is 0.0089 inches (shown as dimension D in FIG. 6). The separation between the center lines of gutter slot 202 and adjacent bleed slot 102 is 0.0210 inches (shown as dimension A in FIG. 6) and the width of the end land 504 between gutter slot 106 and adjacent bleed slot 102 is approximately 0.0085 inches. Because of reduced end element wear, this configuration provides a useful life that is enhanced in comparison to the IBM 3480 and StorageTek 4480 tape heads. Thus, this is an improved head design for operation at tape speeds of 2 meters/second.

Although bleed slots 102 are described herein as being formed in parallel to the direction of motion of the magnetic tape, it should be understood that bleed slots 102 could be situated such that they are at an angle with respect to the direction of motion of the magnetic tape.

The tape heads, and tape head contours described herein are suitable for operation with numerous magnetic tape drive units and tape recorders. Two such examples are the IBM 3490E tape drive, available from International Business Machines, in Armonk, N.Y., and the StorageTek 4480 tape drive available from Storage Technology Corporation in Louisville, Colo.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A magnetic tape head having a plurality of magnetic elements and a contour for maintaining an optimum and uniform flying height of a magnetic tape moving across a length of a gap of the magnetic tape head, the contour comprising:

a plurality of bleed slots formed in the contour;
  a plurality of lands interspersed between said bleed slots, said bleed slots being formed such that said lands are each of a width from 0.0040 to 0.0065 inches to optimize the flying height of the magnetic tape moving across the length of the gap of the magnetic tape head at speeds greater than 2 meters/second, said bleed slots being sufficiently great in number to uniformly maintain the flying height across the tape so that the plurality of magnetic elements are positioned in the gap independently of the position of said lands and said bleed slots.

2. The magnetic tape head contour of claim 1, wherein said lands are 0.0055 inches wide.

3. The magnetic tape head contour of claim 1, wherein the tape head contour comprises thirty (30) bleed slots.

4. The magnetic tape head contour of claim 1, further comprising a single gutter slot at each end of the head contour configured to provide additional material between said single gutter slot and its adjacent end element such that end-element wear is reduced and useful tape head life is extended.

5. The magnetic tape head contour of claim 4, wherein a width of an end land formed between one of said gutter slots and an end bleed slot is manufactured to a looser tolerance than are said lands.

6. The magnetic tape head contour of claim 4, wherein an end land formed between one of said gutter slots and an end bleed slot is 0.0045 to 0.0063 inches wide.

7. A magnetic tape head for at least one of reading from and writing to a magnetic tape moving across the tape head at increased speeds while maintaining an optimum and uniform head-to-tape separation, the tape head having first and second read/write modules, wherein said first and second modules each comprise:

a plurality of magnetic elements;
  a contour having
    a gap wherein said plurality of magnetic elements are disposed,
    a plurality of bleed slots formed in said contour, and
    a plurality of lands interspersed between said bleed slots,
    wherein said bleed slots are formed such that said lands are of a width from 0.0040 to 0.0065 inches to optimize the head-to-tape separation over said gap at a tape speed greater than 2 meters/second, and
    wherein the number of said bleed slots is sufficiently great to uniformly maintain the head-to-tape separation across the magnetic tape so that said plurality of magnetic elements are disposed in said gap independently of the position of said lands and said bleed slots; and a gutter slot formed on each end of said contour.

8. The magnetic tape head of claim 7, wherein said bleed slots are formed in parallel to the direction of motion of the magnetic tape.

9. The magnetic tape head of claim 7, wherein said contour comprises thirty (30) bleed slots.

10. The magnetic tape head of claim 7, wherein said gutter slot is formed such that material between said gutter slot and an adjacent end element is of sufficient width to reduce end element wear and to enhance useful head life.

11. The magnetic tape head of claim 7, wherein said bleed slots are provided on each edge of said first and second read/write modules.

12. The magnetic tape head of claim 7, wherein said bleed slots are provided on each edge of said first read/write module and on only one edge of said second read/write module.

13. The magnetic tape head of claim 7, wherein said bleed slots are provided on only one edge of said first read/write module and on only one edge of said second read/write module.

14. A magnetic tape head comprising:

a plurality of magnetic elements; and
  a tape head contour having
    a longitudinal gap formed in said contour, and
    a plurality of bleed slots formed in said contour, said bleeds slots formed such that a land between two longitudinally adjacent bleed slots is of a sufficient width to provide an optimum head-to-tape separation of a magnetic tape over said gap, said bleed slots being of a sufficient number that the head-to-tape separation of said magnetic tape moving across said gap is uniform across said magnetic tape, said plurality of magnetic elements positioned along said gap independently of the position of said bleed slots and said lands.

15. A method for manufacturing a magnetic tape head having a tape head contour and a plurality of magnetic elements, the contour having a longitudinal gap, the method comprising the steps of:

1) forming a plurality of bleed slots in the tape head contour such that
    a) a land between two longitudinally adjacent bleed slots is of a sufficient width to optimize the head-to-tape separation of a magnetic tape moving across the gap, and
    b) said bleed slots are of a sufficient number that the head-to-tape separation of the magnetic tape is uniformly maintained across the magnetic tape; and
  2) positioning the plurality of magnetic elements along the gap at points independent from the position of said bleed slots and said lands.

16. A magnetic tape head for maintaining an optimum and uniform flying height of a magnetic tape moving across a length of a gap of the magnetic tape head, comprising:

a longitudinal gap;
  a plurality of lands interspersed between a plurality of bleed slots formed in the magnetic tape head such that said lands are of a width to optimize the flying height of the magnetic tape moving across the length of said gap at speeds greater than 2 meters/second, wherein a number of said bleed slots is sufficiently great to uniformly maintain the flying height across the magnetic tape; and
  a plurality of magnetic elements positioned in said gap independently from the position of said lands and said bleed slots.

17. A tape head comprising:

a longitudinal gap;

a plurality of lands interspersed between a plurality or bleed slots formed in the tape head such that said lands are of a width to optimize a head-to-tape separation of a tape moving across a length of said gap of the tape head at speeds greater than 2 meters/second; and a plurality of magnetic elements disposed in said longitudinal gap independently of said lands and said bleed slots, wherein a number of said bleed slots is sufficiently great to minimize an undulating wear profile of the tape head.

18. A method for manufacturing a magnetic tape head having a tape head contour and a plurality of magnetic elements, the contour having a longitudinal gap, the method comprising the steps of:

1) forming a plurality of bleed slots in the tape head contour such that a) a land between two longitudinally adjacent bleed slots is of a sufficient width to optimize the head-to-tape separation of a magnetic tape moving across the gap, and b) said bleed slots are of a sufficient number to minimize an undulating wear profile of the tape head contour; and 2) positioning the plurality of magnetic elements along the gap at points independent from the position of said bleed slots and said lands.

19. A magnetic tape head comprising:

a tape head contour having a longitudinal gap, and a plurality of lands interspersed between a plurality of bleed slots formed in said contour; and a plurality of magnetic elements positioned in said gap independently from said bleed slots and said lands, wherein said bleeds slots are formed such that a land between two longitudinally adjacent bleed slots is of a sufficient width to provide an optimum head-to-tape separation of a magnetic tape over said gap, and wherein said bleed slots are of a sufficient number to minimize an undulating wear profile of said tape head contour.

* * * * *